March 14, 1961 K. TEER 2,975,233

TRANSMISSION SYSTEM FOR TELEVISION SIGNALS

Filed June 27, 1956 4 Sheets-Sheet 1

INVENTOR
KEES TEER

BY Fred M. Vogel
AGENT

March 14, 1961 K. TEER 2,975,233

TRANSMISSION SYSTEM FOR TELEVISION SIGNALS

Filed June 27, 1956 4 Sheets-Sheet 2

INVENTOR
KEES TEER

BY Fred M. Vogel
AGENT

TRANSMISSION SYSTEM FOR TELEVISION SIGNALS

Filed June 27, 1956 4 Sheets-Sheet 3

INVENTOR
KEES TEER
BY Fred M. Vogel
AGENT

March 14, 1961 K. TEER 2,975,233

TRANSMISSION SYSTEM FOR TELEVISION SIGNALS

Filed June 27, 1956 4 Sheets-Sheet 4

INVENTOR
KEES TEER

BY Fred M. Vogel
AGENT

United States Patent Office 2,975,233

Patented Mar. 14, 1961

2,975,233

TRANSMISSION SYSTEM FOR TELEVISION SIGNALS

Kees Teer, Eindhoven, Netherlands, assignor, by mesne assignments, to North American Philips Company, Inc., New York, N.Y., a corporation of Delaware Filed June 27, 1956, Ser. No. 594,151

Claims priority, application Netherlands July 11, 1955

12 Claims. (Cl. 178—5.6)

This invention relates to transmission systems for signals corresponding to television images or similar images which are scanned linewise, and in which at least two auxiliary carrier waves, modulated by signals corresponding to similar images, are also transmitted.

Such systems may be used for colour television. An example of such systems is one in which a signal of large bandwidth, which concerns the brightness component of the television images, is transmitted continuously, while two other signals of smaller bandwidth each relating to a particular colour aspect of the television images and each modulated on a separate auxiliary carrier wave, are likewise transmitted continuously.

In such systems it suffices at the receiver end, for demodulation of the signals modulated on an auxiliary carrier, to use a band-pass filter and a detector circuit without the need for further information from the transmitter at the detector. This information is, on the contrary, required if the two signals of smaller band-width are modulated in quadrature on a single auxiliary carrier. For detection these quadrature signals, the receiver requires two auxiliary oscillations, the frequencies of which correspond to those of the auxiliary carrier, a particular phase-relationship prevailing between these auxiliary oscillations and the auxiliary carrier. In order to obtain the said frequency equality and said phase-relationship between the auxiliary oscilations produced in the receiver and the auxiliary carrier produced in the transmitter, the transmitter emits further information about this auxiliary carrier. In a known system, this further information consists of a reference signal (colour burst), the frequency of which corresponds to that of the auxiliary carrier, a fixed phase-relationship existing between this reference signal and the auxiliary carrier produced in the transmitter. This reference signal is emitted periodically, i.e. during the back-porches of the line-synchronisation pulses.

Such reference signals with the correct frequency and the correct phase are not required for demodulation of the auxiliary carrier in the systems to which the invention applies. In accordance with the invention it is, however, to be preferred to transmit simultaneously reference signals, be it for quite different reasons, whilst, on the other hand, a correct phase-relationship between these reference signals and the auxiliary carriers produced in the transmitter is quite irrelevant.

This reason will be explained more fully hereinafter. A colour television transmitter emits, either with the aid of a main carrier or without it, a signal of large bandwidth and, for example, two signals of smaller bandwidth, each modulated on a different auxiliary carrier. The signal of large bandwidth may be a brightness signal and the two signals of smaller bandwidth may be colour signals. The frequencies of the auxiliary carriers lie either outside the frequency of the band of the signal of large bandwidth or inside this frequency band, where the higher frequencies of the signal of large bandwidth lie. It is known that the signals to be finally fed to the picture tube(s) are, as a rule, formed by combining in a particular ratio the three signals thus transmitted. For true reproduction of the scene converted into television signals at the transmitter end it is, of course, desirable for the amplitudes of three transmitted signals to maintain their same ratio to one another at the beginning and at the end of the transmission path. If it is assumed that the scene to be reproduced is an orange plane and that, for some reason or other the amplitude of the colour signal relating to the red light components of the scene to be reproduced is reduced to zero, the image finally reproduced at the receiver end will represent a green plane. The fact that the signal relating to a colour component is completely suppressed is, of course, an extreme case, but it will be obvious that any linear distortion in the transmission path, for example selective fading and frequency-dependent reflection in the case of transmission with the aid of a carrier wave or a frequency-dependent transmission characteristic in the case of cable-transmission, does not contribute to the desired true reproduction.

The system according to the invention meets these disadvantages and has the feature that a reference signal is supplied to the transmission channel at the transmitter during the occurrence of the back porch intervals of the line synchronization pulses. Such a reference signal is transmitted for each of at least two of the signals which are modulated on the auxiliary carriers. The amplitude of each reference signal is constant and its frequency is equal or at least substantially equal to the frequency of the corresponding auxiliary carrier. The reference signal associated with one of the signals modulated on an auxiliary carrier is transmitted during the back porches of the line-synchronisation pulses other than those during the back porches of which the reference signal associated with another of the signals modulated on an auxiliary carrier are transmitted. At the receiver end provision is made of means which control the amplification factor of the signal channel within the receiver for such a signal modulated on an auxiliary carrier in accordance with the amplitude of the associated reference signal.

In order that the invention may be more readily carried into effect examples will now be described with reference to the figures of the drawings, in which Fig. 1 shows the frequency spectrum of three television signals in the transmission channel with a system according to the invention.

Figure 1:
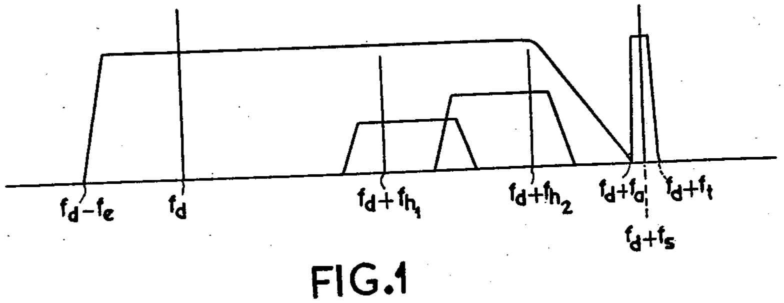
Figure 2:
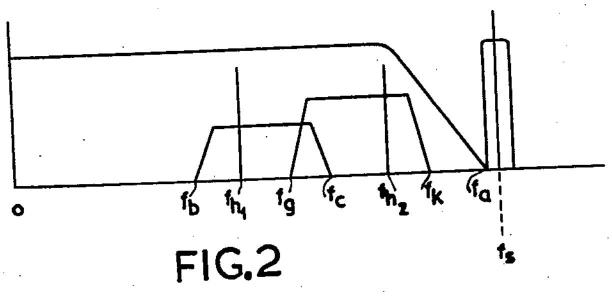
Fig. 2 shows the frequency spectrum of these three signals at the transmitter end.

Fig. 1 shows an example of a frequency spectrum occurring in a colour television system according to the invention. Such a frequency spectrum, which extends from a frequency $f_d-f_e$ to a frequency $f_d+f_a$, is produced by modulation of a carrier wave of the frequency $f_d$ by three signals, the first of which extends in a frequency band from 0 to $f_a$, the second from $f_b$ to $f_c$ and the third from $f_g$ to $f_k$, as shown in Fig. 2, part of the lower sideband being suppressed. The signal of large bandwidth may for example be a brightness signal; the second signal between the frequencies $f_b$ and $f_c$ is produced by modulating an auxiliary carrier of the frequency $f_{h1}$ by one of the colour signals; the third signal between the frequencies $f_g$ and $f_k$ is produced by modulating an auxiliary carrier of the frequency $f_{h2}$ by the other colour signal. Preferably the auxiliary carriers have, of course, such frequencies and, as the case may be, such phase differences that relative interference of the various signals is little troublesome to the eye at the reproducing picture tube.

Such a frequency spectrum is, of course, likewise produced by modulating a carrier of the frequency $f_d$ by the signal of large bandwidth and by modulating each of two carriers of frequencies $f_d+f_{h1}$ and $f_d+f_{h2}$ by a colour signal. Subsequent to demodulation in the receiver, however, the carriers $f_d+f_{h1}$ and $f_d+f_{h2}$ appear yet again in the video frequency spectrum of the signal of large bandwidth as auxiliary carriers of the frequencies $f_{h1}$ and $f_{h2}$.

It is known that, as a rule, the attenuation of the signal composed by the carrier modulated by the aforesaid three signals during the transmission path from the transmitter to the receiver will vary with time for reasons known per se. This may even be the case in parts of the transmission channel in the transmitter and in the receiver themselves, owing to variations of tube characteristics and so on. These unwanted variations are generally compensated as far as possible by automatic gain control, the reference value being for example the amplitude of the line-synchronisation pulses, viewed from the black levels.

The frequency of these line-synchronisation pulses is, however, comparatively low. If the aforesaid variable attenuation were independent of frequency, this would not be objectionable; however, this attenuation is, in fact, found to depend upon the frequency. In addition, the colour signals and the brightness signal partly pass over separate channels in the receiver, so that even with a frequency independent transmission channel, owing to variations in the individual channels, said ratio between the amplitudes of the three signals at the end of the transmission channel may depart from this ratio at the beginning of the transmission channel. Control on the line synchronizing pulses thus results in that only the frequencies in the proximity of the carrier, in this case the low frequencies of the brightness signal, are maintained at the desired level. With monochrome transmission this is found to cause little trouble in practice, since it is the lower frequencies which contribute most to a satisfactory result. In colour-television transmission by means of a system according to the invention, the colour information is transmitted in a frequency range which is comparatively remote from the frequency range in which the said level control operates efficiently. It will be obvious that this and the fact that the three signals partly pass over separate channels may give rise to images which differ materially from the images wanted.

In accordance with the invention, a reference signal is supplied to the transmission channel at the transmitter end during the occurrence of back porches of line-synchronisation pulses for both signals modulated on an auxiliary carrier. The amplitude of this reference signal is constant and its frequency signals are approximately equal to the frequency of the associated auxiliary carrier. The reference signal corresponding to one of the signals modulated on an auxiliary carrier is transmitted during selected ones of the back porches of the line synchronisation pulses. Similarly, the reference signal corresponding to the other signal modulated on an auxiliary carrier is transmitted during others of the line synchronisation pulses.

Figure 3:
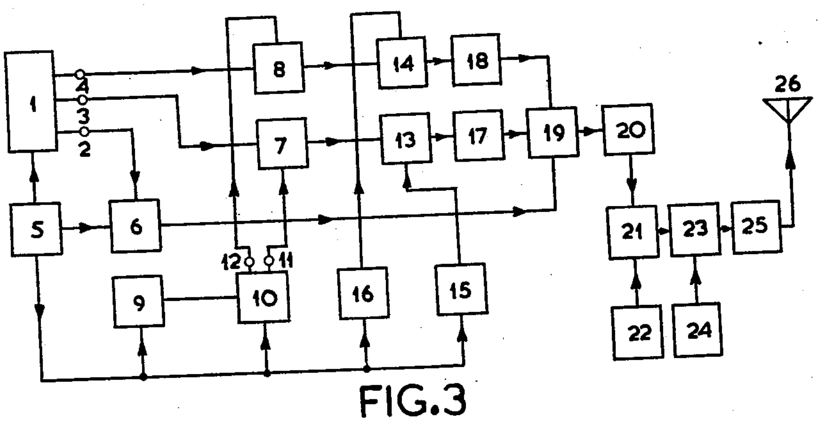
Fig. 3 shows diagrammatically a form of a transmitter for use in a system according to the invention.

Fig. 3 shows in a block diagram a simplified form of a transmitter for use in a transmission system according to the invention. The device 1 produces the brightness signal and the two colour signals at the outputs 2, 3 and 4. To this end the device 1 comprises the required camera tubes and any further required equipment. The line- and frame-synchronisation pulses are produced in the device 5. These pulses are supplied both to the device 1 to control the time base devices of the camera tubes and to the adding device 6, to which is also supplied the brightness signal occurring at the output 2.

Figures 4, 5, 6, 7:
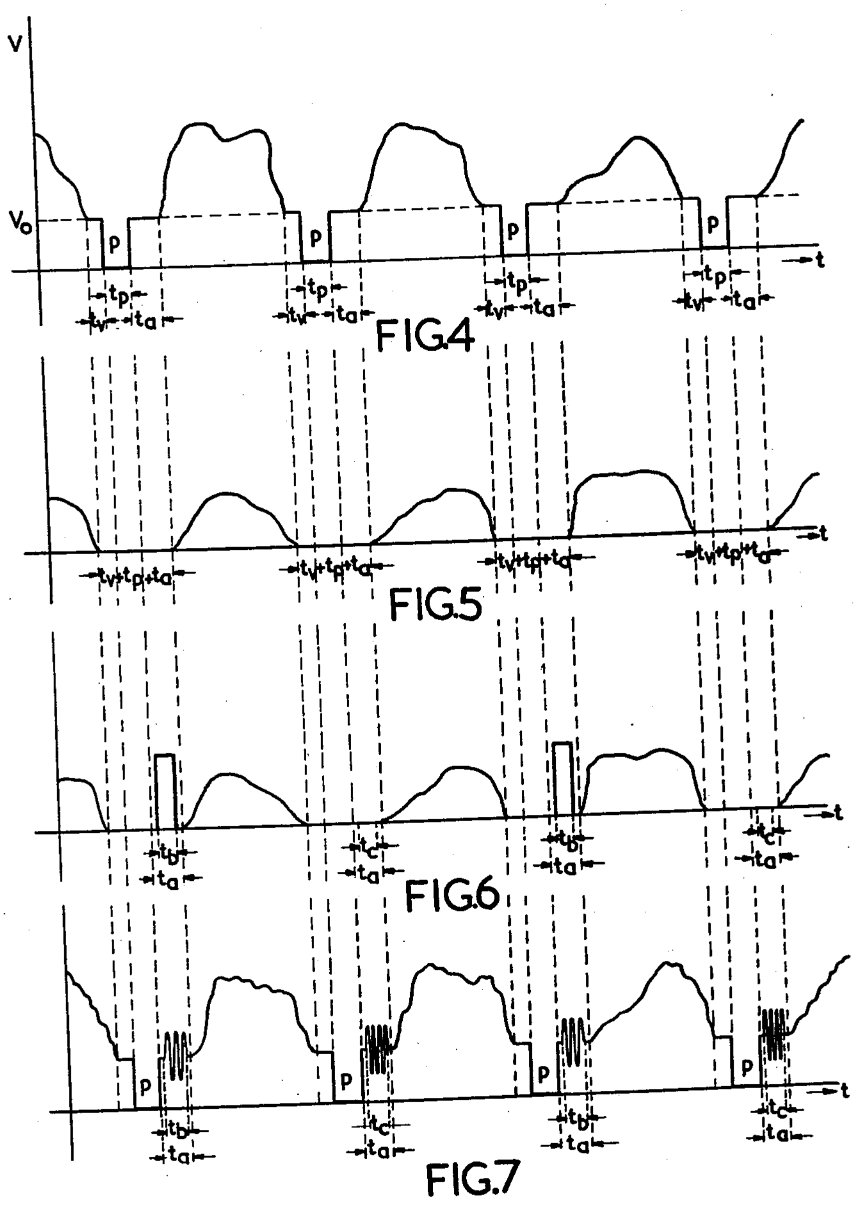
Figs. 4, 5, 6 and 7 show signal forms likely to occur in a system according to the invention.

The well-known shape of the amplitude V of the signal thus occurring at the output of addition device 6 is shown in part as a function of time in Fig. 4. Reference $p$ designates the line-synchronisation pulses, $V_o$ designates the black level. $V_o$ is a constant value. The line-synchronisation pulses occur during the periods $t_p$, the front porches of the black level occur during the periods $t_v$ and the back porches of the black level occur during the periods $t_a$. The frame-synchronisation pulses, the equalization pulses and so on are not shown in this figure.

Fig. 5 shows the form of an output signal occurring at the outputs 3 or 4. From the figure it is evident that the amplitude of such a signal is reduced to zero during the periods $t_v+t_p+t_a$. Each of the output signals occurring at the outputs 3 and 4 is supplied to an adding device 7 and 8 respectively. To the addition device 7 is also supplied the output signal from the output terminal 11 of the device 10. To the addition device 8 is supplied the output signal from the output terminal 12 of the device 10. The device 10 is a switch to which the output signal of the device 9 is supplied. The device 9 supplies pulses of the same repetition frequency as the line-synchronisation pulses, however, they are narrower than the line-synchronisation pulses and are, at the same time, delayed relatively to the latter to an extent such that they occur during part of each of the periods $t_a$. The device 9 is preferably synchronized, for example, by the line-synchronisation pulses from the device 5. The switch 10 is likewise controlled by the line-synchronisation pulses from the device 5 in such manner that during one line period and consequently also during one time period $t_a$ the output signal of the device 9 appears at the output terminal 11 and that during a next line period, and consequently also during the next time period $t_a$, the output signal of the device 9 appears at the output terminal 12. The output signal of the addition device 7 consequently has the form shown in Fig. 6. During the time periods $t_b$, which are consequently spaced in time by two line-periods, pulses consequently occur which will act as the aforesaid reference signals. The output signal of the addition device 8 has the same shape; however, the pulses forming part of this signal will be shifted one line period relative to the pulses appearing at the output of the addition device 7 and will consequently occur during the time periods $t_c$ (Fig. 6). The output signals of the devices 7 and 8 are supplied each to a modulator 13 and 14 respectively, to which is also supplied an auxiliary carrier of the frequency $f_{h1}$ and $f_{h2}$ respectively. These auxiliary carriers originate from the devices 15 and 16, which comprise oscillators suiting the purpose. In view of the aforesaid choice of the frequency, and to prevent any phase leaps which might cause relative interference of the signals during reproduction, these oscillators are controlled by the line- or frame-synchronisation pulses from the device 5. The output signal of the modulator 13 is fed to a band-pass filter 17 having a pass-band between the frequencies $f_b$ and $f_c$; the output signal of the modulator 14 is fed to a band-pass filter 18 having a pass-range between the frequencies $f_g$ and $f_k$. The output signals of the adding device 6, the band-pass filter 17 and the band-pass filter 18 are combined in the adding device 19. The output signal of the adding device 19 thus has the shape indicated in Fig. 7. The signal portion during the periods $t_b$ is formed by superimposition of the back porches of the line synchronisation pulses and of the pulses shown in Fig. 6, which occur during the periods $t_b$ and are modulated on the auxiliary carrier of the frequency $f_{h1}$. The signal portion occurring during the periods $t_c$ results from super position of the back porches of the line synchronisation pulses and the pulses not shown in Fig. 6, which occur during the periods $t_c$ and are modulated on the auxiliary carrier of a frequency $f_{h2}$. The signal portion occurring during the periods $t_g$ is formed by superimposition of the brightness signal and the two modulated colour signals.

The output signal of the device 19 is then fed to a low-pass filter 20, having a cut-off frequency $f_a$, and then combined in the adding device 21 with the sound signal modulated on a carrier of the frequency $f_s$. This modulated sound signal is obtained from a device 22, which, to this end, comprises the required microphones, amplifiers, modulators and so on.

The output signal of the device 21 may be transferred either to a transmission cable or, as is shown in the figures, to a modulator 23, wherein said signal is modulated on a carried delivered by a source 24, the frequency of this carrier being $f_d$. Thereafter the signal obtained is supplied to band-pass filter 25, having a pass-range between the frequencies $f_d-f_e$ and $f_d+f_t$ (Fig. 1) and then to a transmitter aerial 26.

Figure 8:
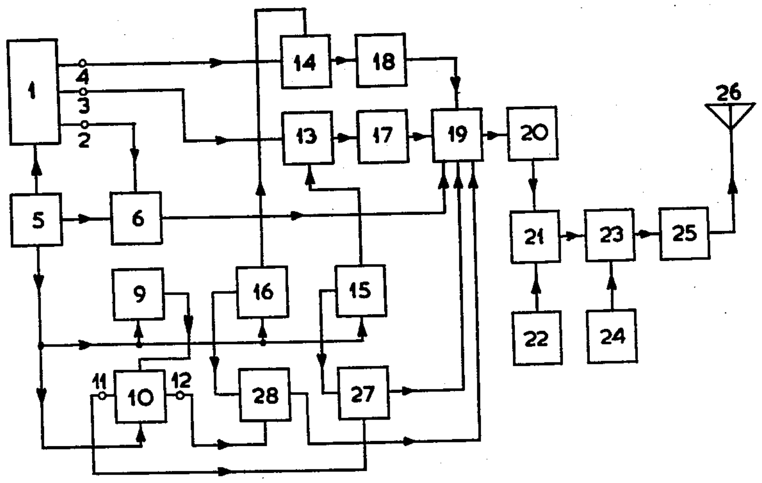
Fig. 8 shows diagrammatically a form of a transmitter for use in a system according to the invention.

Of course introduction of the reference signals may alternatively occur in a slightly different manner. Fig. 8 shows in a block diagram a simplified form of transmitter used in a transmission system according to the invention, wherein a different method is used to introduce the reference signals. Corresponding parts of Figs. 3 and 8 are designated by the same reference numerals. In this embodiment, the signals at the outputs 3 and 4 are fed directly to the modulators 13 and 14 respectively. The output signals at the output terminals 11 and 12 respectively of the device 10 are modulated in different modulators 27 and 28 on the auxiliary carriers from the devices 15 and 16. The output signals of these modulators which are in the form of bursts at the respective subcarrier frequencies are supplied to the adding device 19, together with the output signals of the devices 6, 17 and 18.

Figure 9:
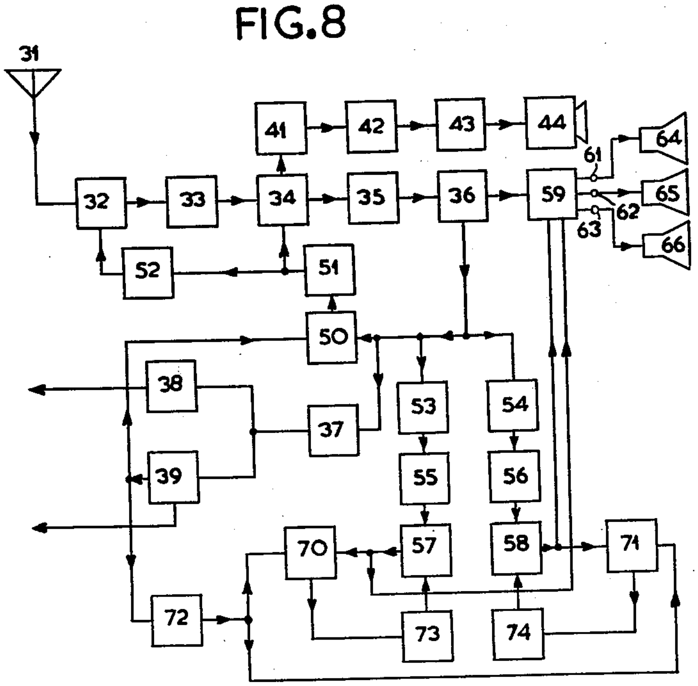
Fig. 9 shows diagrammatically a form of a receiver for use in a system according to the invention.

Fig. 9 shows, in a block diagram, a simplified form of a receiver suitable for the reception of signals emitted by a transmitter as described with reference to Figs. 3 and 8. Reference numeral 31 designates a suitable aerial system for the reception of the carrier modulated by the television signals. The aerial system 31 is coupled to a high-frequency amplifier 32 and a mixer stage 33, comprising a suitable oscillator. The output signal of 33 is fed to an intermediate-frequency amplifier 34 which is coupled to a detector 35 and a video-amplifier 36.

The carrier, modulated by the sound signal may be separated from the television signal in the intermediate-frequency stage 34 or in the detector 35, according as to whether use is made or not made of the intercarrier-wave principle. It is then supplied to an intermediate-frequency stage 41, which in turn is coupled to a sound-detector 42. The output signal of the detector 42 is fed via a low-frequency amplifier 43 to one or more loudspeakers 44. In Fig. 9, the sound-carrier is shown separated from the television signal in the intermediate-frequency stage 34.

The synchronisation signals contained in the output signal of the video amplifier 36 are recovered from this output signal in the separating circuit 37.

The synchronisation pulses for the vertical deflection are fed to the device 38 to synchronize the sawtooth generator forming part thereof; the output currents of 38 are fed to the vertical deflecting coils (not shown) of the various picture tubes.

The synchronisation pulses for horizontal deflection are fed to the device 39 to synchronize the sawtooth generator forming part thereof; the output currents from 39 are fed to the horizontal deflecting coils (not shown) of the picture tubes.

These devices 38 and 39 moreover comprise any required fly-wheel arrangements, and from the device 39 a direct voltage may be obtained in known manner from the flyback of the line-sawtooth generator, which direct voltage may be used as a high tension for the picture tubes.

For the conventional gain control the fly-back pulses from the device 39 may be fed in known manner to a device 50, to which is also fed the output signal of the video amplifier 36. The device 50 comprises a gate circuit, which becomes conductive by the action of the said fly-back pulses only during the occurrence of the line- and frame-synchronisation pulses. The pulses at the output of the gate circuit, the amplitudes of which pulses are proportional to the corresponding peak values of the synchronisation pulses, determine the level of the signal at the output of the video-amplifier 36. The pulses thus obtained may be fed via smoothing networks 51 and 52 as control-voltages to the high- and intermediate-frequency stages.

As has been stated, this control has the disadvantage that, indeed, only the low frequencies of the signal at the output of the amplifier 36 are brought to the correct level, which does not apply to the frequencies particularly lying in the range between $f_b$ and $f_c$ and between $f_g$ and $f_k$, i.e. those frequencies which relate to colour information.

The output signal of the amplifier 36 is also fed to a band-pass filter 53 having a pass-range between the frequencies $f_b$ and $f_c$ and to a band-pass filter 54 having a pass-range between the frequencies $f_g$ and $f_k$. The output signals of the filters 53 and 54 are fed to detectors 55 and 56 respectively. The signals at the outputs of detectors 55 and 56 have the form shown in Fig. 6, these signals thus containing the reference signals occurring during the periods $t_b$ and the periods $t_c$ respectively.

The devices 55 and 56 are in turn connected to video-amplifiers 57 and 58. The output signals of the video-amplifiers 36, 57 and 58 are fed to a device 59 which comprises suitable known combination networks. At the outputs 61, 62 and 63 of the device 59 signals occur which relate to the red, green and blue components respectively of the scene to be reproduced. These signals may be supplied to the control-elements of picture tubes 64, 65 and 66 which reproduce these signals in red, green and blue light respectively. The signals may, of course, also be applied to the control-elements of a single three-colour picture tube comprising three electron guns. If use is made of a three-colour picture tube comprising one electron gun, the signals must be applied to the control-element of this tube in a particular order of time.

Any phase shifts of the various signals relative to one another have so far been disregarded. These phase shifts may be compensated in known manner, for example with the aid of delay lines.

Figure 10:
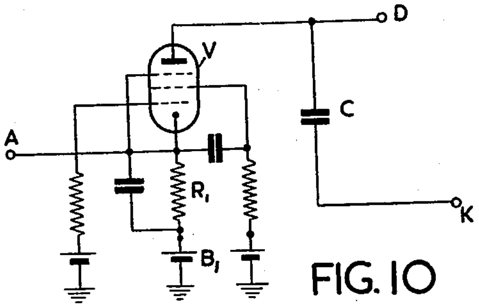
Fig. 10 shows a circuit arrangement for use in the receiver shown in Fig. 9, and Fig. 11 also shows diagrammatically a form of a receiver for use in a system according to the invention.

The output signals of the amplifiers 57 and 58 are fed to devices 70 and 71 respectively, both of which comprise a gate circuit and to which the output signals of a device 72 are supplied. For the sake of completeness it is stated that in the circuits between the detectors 55 and 56 on the one hand and the devices 70 and 71 on the other hand the direct current component must not get lost. This device 72 is a delaying network which delays the fly-back pulses from the device 39 for such a period that these pulses coincide in time with the reference pulses contained in the output signals of the amplifiers 57 and 58. An example of such a gate circuit is shown separately in Fig. 10. The video-signals from an amplifier 57 or 58 are fed via terminal A to a cathode-resistor $R_1$ of a tube V; this cathode-resistor is connected, on the side remote from the cathode, to the positive terminal of a battery $B_1$. The anode of the tube V is connected via a decoupling capacitor C through the terminal K to the device 72, which thus furnishes the fly-back pulses from the device 39, which partly coincide in time with the reference signals contained in the signal applied to the terminal A. The voltage of the battery $B_1$ is chosen to be so high that the tube V does not become conductive under the action of the signal applied to the terminal A alone. It does, however, if said delayed fly-back pulses occur at the anode, these pulses having an adequately high voltage. This means that, if the output signal from the device 57 is supplied to the terminal A, during the occurrence of those fly-back pulses which are produced during the periods $t_b$, pulsatory signals are likewise produced at the terminal D, the amplitude of which is determined by the amplitude of the reference signals occurring at the input terminal A. It is to be noted that during those fly-back pulses, which occur during the time periods $t_c$, no pulsatory signals are produced at the terminal D. From these pulses produced at the terminal D a control voltage can be derived in known manner, the value of which is determined by the level of signals appearing at the output of the amplifier 57. Similarly, if the output signal from the device 58 is supplied to the terminal A during the occurrence of those fly-back pulses, which occur during the time-periods $t_c$, pulsatory signals are obtained at the terminal D, from which signals a control voltage can be derived, the value of which is determined by the level of signals appearing at the output of the amplifier 58. The pulses at the output of the device 70 which consequently comprise such a gate circuit, fed as a control voltage via the smoothing network 73 to the amplifier 57, the amplification factor of which is controlled in accordance with the control-voltage concerned, in a manner similar to that of the aforesaid conventional gain control, so that with an increase in value of the level of the signal at the output of the amplifier 57 the amplification factor of this amplifier decreases. The network 73 may, for example, comprise a peak detector consisting of a diode and a R–C network, the time constant of which exceeds at least several times double the line period.

The output signal of the device 71 is likewise fed via a smoothing network 74 to an amplifier 58, so that the amplification factor of this amplifier is also controlled in accordance with the control-voltage concerned.

The output signals of each amplifier 36, 57 and 58 have consequently been brought to the same level, correction for any (of course not too swift) variations in the transmission channels of the three television signals up to and inclusive of these amplifiers having been effected.

It is to be noted in this respect that, since the detector circuits 55 and 56 are based on the conventional rectifier principle, the frequency of the auxiliary carrier on which the colour signal is modulated and the frequency of the associated reference signal need not be equal. In view of the purpose of the introduction of the reference signals the difference between these two frequencies must, of course, not be too high.

It is to be noted that the control-voltage from the device 70 or 71 may at the same time be used effectively for controlling the level of the sound signal. To this end use is preferably made of the control-voltage derived from the reference signal which relates to that auxiliary carrier, the frequency of which is nearest the sound carrier.

It is clear that the terminals K of the devices 70 and 71 may alternatively be supplied with pulse trains coinciding only with the reference pulses forming part of the signal concerned, for example to the terminal K of the device 70 a pulse train, the pulses of which occur only during the time periods $t_b$ and, similarly to the terminal K of he device 71 a pulse train, the pulses of which occur only during the time periods $t_c$. This might, for example, be effected by supplying the pulse train from the device 72 to a device similar to the device 10 of the transmitter shown in Fig. 3 or Fig. 8. The switch of this device would moreover have to be operated synchronously with the switch of said device 10. It will be appreciated that the solution chosen for the receiver shown in Fig. 9 is considerably simpler than the solution according to which a separate pulse train is fed to either of the devices 70 and 71.

It is highly preferable, at the transmitter end, to make the amplitude of the signal to be modulated on an auxiliary carrier at most equal to the amplitude of the associated reference signal, since this permits the use of a receiver which is considerably simpler than the receiver set out with reference to Fig. 9. From the colour signals obtained after detection with the associated pulses which occur during the time periods $t_b$ and $t_c$ respectively, the latter need no longer be separated from the colour signals concerned by means of devices comprising a gate circuit, since these colour signals with the corresponding pulses can now be supplied directly to a peak detector in order to obtain a control voltage. In effect, in connection with the fact that the colour signals have amplitudes at most equal to said corresponding pulses, the colour signals referred to hardly affect the output voltage of such a peak detector and the output voltage of such a peak detector is well-nigh exclusively determined by the amplitude of said pulses.

Figure 11:
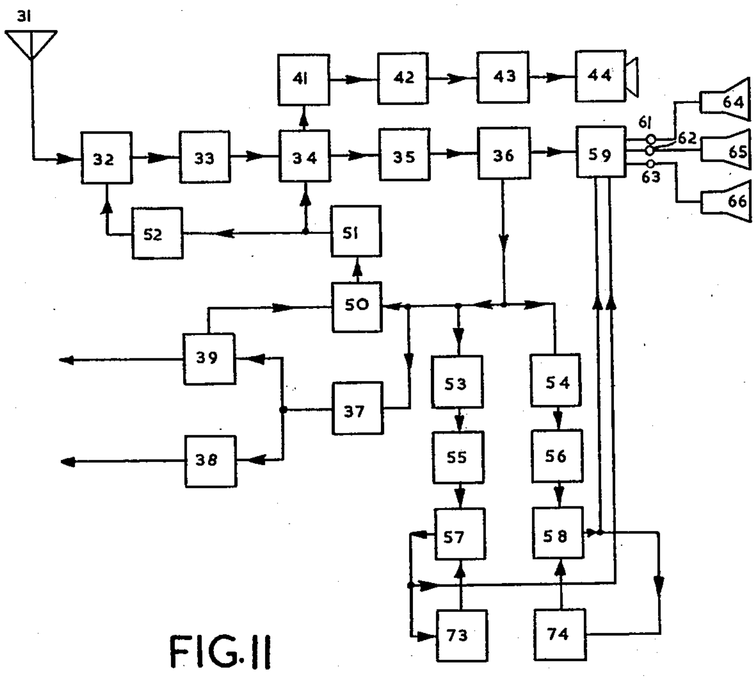

Fig. 11 shows a form of a receiver for use in a system satisfying the condition that the amplitude of the signal modulated on an auxiliary carrier should at most be equal to the amplitude of the associated reference signal. Corresponding parts of Figures 9 and 11 are numbered the same. In contradistinction to what happens in the receiver shown in Fig. 9, the output signals of the amplifiers 57 and 58 are now directly supplied to the devices 73 and 74 each comprising a peak detector which again comprises, for example, a diode and a RC-network, the time constant of which at least several times exceeds twice the line period. The control-voltages across the outputs of the devices 73 and 74 are again supplied to the amplifiers 57 and 58 respectively, the amplification factor of which is again controlled in accordance with the control voltage concerned. When comparing Figures 9 and 11, it is seen that the devices 70, 71 and 72 are omitted in the circuit, and in addition the device 72, which delays the flyback pulses from the device 39, are found to be omitted in the receiver shown in Fig. 11.

In the foregoing it has been postulated that the two reference signals are alternately supplied to the transmission channel during the occurrence of the back-porches of successive line-synchronisation pulses. Though this method is to be preferred, in conjunction with continuity of the control at the receiver-end and simplicity in regard to the production of pulse trains at the transmitter-end, it will be appreciated that the reference signals may alternatively be transmitted in a different sequence. For example, each two reference pulses, associated with the same colour signal, may be transmitted successively, and subseqeuntly two reference pulses associated with the other colour signal. It will moreover be evident that the receivers show in Figures 9 and 11 may also be employed with such a sequence of the reference signals. As the case may be, the RC-times of the peak detectors then have to be made slightly longer.

What is claimed is:

1. A television system comprising a transmitter and a receiver, said transmitter comprising sources of at least two television signals, sources of at least two auxiliary carrier waves of different frequency, at least two channels each including means for modulating a separate one of said carrier waves with a different one of said television signals, means for producing synchronizing pulses having back porches which occur at periodic intervals, a source of a first constant-amplitude alternating reference signal, said first reference signal occurring during the occurrence of some of said back porches and having a first frequency corresponding substantially to the frequency of the auxiliary carrier associated with a first one of said channels, a source of a second constant-amplitude alternating reference signal, said second reference signal occurring during the occurrence of some of said back porches other than the back porches during which said first reference signal occurs and having a second frequency different from said first frequency corresponding substantially to the frequency of the auxiliary carrier associated with a second one of said channels, means for combining said modulated carrier waves and said first and second reference signals thereby to produce a resultant wave, means for transmitting said resultant wave to said receiver, said receiver comprising means for amplifying said modulated auxiliary carrier waves, means for detecting said auxiliary carrier waves thereby to recover said television signals, and an automatic gain control means for controlling the intensity of said recovered television signals in accordance with the respective amplitudes of said reference signals.

2. A system as claimed in claim 1, in which said reference signals are supplied to said combining means in alternate sequence during the occurrences of successive back porches of said synchronizing pulses.

3. A system as claimed in claim 1, in which the amplitude of each of said television signals is no greater than the amplitude of the corresponding reference signal.

4. A television transmitter comprising sources of at least two television signals, sources of at least two auxiliary carrier waves of different frequency, at least two channels each including means for modulating a separate one of said carrier waves with a different one of said television signals, means for producing synchronizing pulses having back porches which occur at periodic intervals, a source of a first constant-amplitude alternating reference signal, said first reference signal occurring during the occurrence of some of said back porches and having a first frequency corresponding substantially to the frequency of the auxiliary carrier associated with a first one of said channels, means for applying said first reference signal to said first channel, a source of a second constant-amplitude alternating reference signal, said second reference signal occurring during the occurrence of some of said back porches other than the back porches during which said first reference signal occurs and having a second frequency different from said first frequency and corresponding substantially to the frequency of the auxiliary carrier associated with a second one of said channels, and means for applying said second reference signal to said second channel.

5. A transmitter as claimed in claim 4, in which said reference signals are supplied to said channels in alternate sequence during the occurrences of successive back porches of said synchronizing pulses.

6. A transmitter as claimed in claim 4, in which the amplitude of each of said television signals is no greater than the amplitude of the corresponding reference signal.

7. A transmitter as claimed in claim 4, including a source of auxiliary pulses connected to said first and second channels and adapted to apply pulses to the respective television signals in said channels at times corresponding to the respective occurrences of said first and second reference signals.

8. A transmitter as claimed in claim 4, including means for producing first and second series of auxiliary pulses, the auxiliary pulses of said first series occurring at times corresponding to the occurrences of said first reference signals and the auxiliary pulses of said second series occurring at times corresponding to the occurrences of said second reference signals, modulator means connected to modulate the auxiliary carrier wave which is associated with said first channel with said first series of auxiliary pulses to provide a first auxiliary modulated signal, modulator means connected to modulate the auxiliary carrier wave which is associated with said second channel with said second series of auxiliary pulses to provide a second auxiliary modulated signal, and means for combining said first and second auxiliary modulated signals with the modulated output signals of said first and second channels.

9. A receiver for receiving a composite television signal composed of a sequence of synchronizing pulses each having a back porch associated therewith and at least two auxiliary carriers of different frequency each modulated with a different television signal, a first one of said auxiliary carriers being modulated with a first constant-amplitude alternating reference signal having a first frequency substantially equal to that of said first auxiliary carrier and occurring during the time intervals of some of said back porches, a second one of said auxiliary carriers being modulated with a second constant-amplitude alternating reference signal having a second frequency different from said first frequency and substantially equal to that of said second auxiliary carrier and occurring during the time intervals of some of said back porches other than those during which said first reference signal occurs, said receiver comprising means for deriving the modulation components of said modulated auxiliary carriers, and automatic gain control means for controlling the intensity of said modulation components in accordance with the respective amplitudes of said reference signals.

10. A receiver as claimed in claim 9, in which said automatic gain control means comprises a gate circuit connected to receive one of said auxiliary carriers, means connected to render said gate circuit conductive during the occurrences of said back porches, a filter connected to the output of said gate circuit, and means for applying the output signal of said filter to amplifying means for one of said modulation components thereby to control the amplification thereof.

11. A receiver as claimed in claim 9, in which said composite television signal includes a sound signal, and in which said receiver includes a amplifier for said sound signal and means connecting said automatic gain control means to said amplifier for controlling the gain thereof in accordance with the amplitude of at least one of said reference signals.

12. A television system comprising a transmitter and a receiver, said transmitter comprising sources of at least two television signals, sources of at least two auxiliary carrier waves of different frequency, at least two channels each including means for modulating a separate one of said carrier waves with a different one of said television signal, means for producing synchronizing pulses having back porches which occur at periodic intervals, a source of a first constant-amplitude alternating reference signal, said first reference signal occurring during the occurrence of some of said back porches and having a first frequency corresponding substantially to the frequency of the auxiliary carrier associated with a first one of said channels, a source of a second constant-amplitude alternating reference signal, said second reference signal occurring during the occurrence of some of said back porches other than the back porches during which said first reference signal occurs and having a second frequency different from said first frequency corresponding substantially to the frequency of the auxiliary carrier associated with a second one of said channels, the amplitude of each of said television signals being no greater than the amplitude of the corresponding reference signal, means for combining said modulated carrier waves and said first and second reference signals to thereby produce a resultant wave, means for transmitting said resultant wave to said receiver, said receiver comprising means for amplifying said modulated auxiliary carrier waves, means for detecting said auxiliary carrier waves thereby to receive said television signals, peak detector means for deriving a control voltage from each of the recovered television signals, and automatic gain control means for controlling the intensity of said recovered television signals in accordance with the respective amplitudes of said control voltages.

References Cited in the file of this patent

UNITED STATES PATENTS

| | | |
|---|---|---|
| 2,268,001 | Von Felgel-Farnnolz | Dec. 30, 1941 |
| 2,539,440 | Labin | Jan. 30, 1951 |
| 2,828,354 | Haantjes | Mar. 25, 1958 |

FOREIGN PATENTS

| | | |
|---|---|---|
| 155,397 | Australia | Feb. 24, 1954 |

UNITED STATES PATENT OFFICE
CERTIFICATE OF CORRECTION

Patent No. 2,975,233 March 14, 1961

Kees Teer

It is hereby certified that error appears in the above numbered patent requiring correction and that the said Letters Patent should read as corrected below.

Column 2, line 5, after "of" insert -- the --; column 5, line 17, for "carried" read -- carrier --; column 8, lines 36, 37 and 38, strike out "circuit, and in addition the device 72, which delays the flyback pulses from the device 39, are found to be omitted in the".

Signed and sealed this 21st day of November 1961.

(SEAL)
Attest:

ERNEST W. SWIDER
Attesting Officer

DAVID L. LADD
Commissioner of Patents

USCOMM-DC